US012116826B2

(12) United States Patent
Lee et al.

(10) Patent No.: US 12,116,826 B2
(45) Date of Patent: Oct. 15, 2024

(54) DOOR HINGE WITH DAMPING FUNCTION

(71) Applicant: SEO WON KOREA CO., LTD, Gimhae-si (KR)

(72) Inventors: June Young Lee, Busan (KR); Dong Wook Kim, Busan (KR)

(73) Assignee: SEO WON KOREA CO., LTD. (KR)

( * ) Notice: Subject to any disclaimer, the term of this patent is extended or adjusted under 35 U.S.C. 154(b) by 0 days.

(21) Appl. No.: 18/203,194

(22) Filed: May 30, 2023

(65) Prior Publication Data

US 2023/0295968 A1 Sep. 21, 2023

Related U.S. Application Data

(63) Continuation of application No. PCT/KR2022/004874, filed on Apr. 5, 2022.

(30) Foreign Application Priority Data

May 24, 2021 (KR) ........................ 10-2021-0065881

(51) Int. Cl.
*E05F 3/20* (2006.01)
*E05D 11/08* (2006.01)

(52) U.S. Cl.
CPC .............. *E05F 3/20* (2013.01); *E05D 11/081* (2013.01); *E05Y 2201/254* (2013.01); *E05Y 2201/474* (2013.01); *E05Y 2201/638* (2013.01)

(58) Field of Classification Search
CPC ... E05F 3/20; E05F 1/12; E05F 1/1207; E05F 1/1292; E05D 11/081
See application file for complete search history.

(56) References Cited

U.S. PATENT DOCUMENTS

| | | | | |
|---|---|---|---|---|
| 424,613 A * | 4/1890 | Morris | E05F 3/20 | 16/49 |
| 4,485,522 A * | 12/1984 | Chen | E05F 3/20 | 16/303 |
| 6,178,597 B1 * | 1/2001 | Suzuki | E05F 1/1223 | 16/303 |
| 6,817,064 B2 * | 11/2004 | Kim | E05D 11/105 | 16/335 |

(Continued)

FOREIGN PATENT DOCUMENTS

| | | |
|---|---|---|
| KR | 1020110010242 A | 2/2011 |
| KR | 1020110125727 A | 11/2011 |

(Continued)

OTHER PUBLICATIONS

Korean Office Action (KR 10-2021-0065881), KIPO, Mar. 27, 2023.

International Search Report (PCT/KR2022/004874), WIPO, Aug. 24, 2022.

*Primary Examiner* — Jeffrey O'Brien

(74) *Attorney, Agent, or Firm* — Park & Associates IP Law Office

(57) ABSTRACT

A door hinge with a damping function which is implemented according to the flow of oil when opening and closing a door so that a buffering force is applied during opening of the door, closing of the door is carried out smoothly. Due to rapid return of a damper unit, the damper unit immediately operates even when the door is closed immediately after being opened, thereby enabling smooth opening and closing of the door.

3 Claims, 6 Drawing Sheets

(56) References Cited

U.S. PATENT DOCUMENTS

| | | | | |
|---|---|---|---|---|
| 6,922,869 | B2 * | 8/2005 | Bivens | E05F 3/20 16/342 |
| 7,062,817 | B2 * | 6/2006 | Lee | E05F 1/1223 16/334 |
| 7,127,911 | B2 * | 10/2006 | Nam | E05F 1/1215 16/284 |
| 8,510,911 | B2 * | 8/2013 | Sawa | E05F 1/1223 16/50 |
| 10,865,597 | B2 * | 12/2020 | Chen | F16F 9/516 |
| 10,941,600 | B2 * | 3/2021 | Byun | F16F 9/145 |
| 11,230,869 | B2 * | 1/2022 | Weber | F16F 13/007 |
| 2005/0193523 | A1 * | 9/2005 | Nam | E05F 3/14 16/330 |

FOREIGN PATENT DOCUMENTS

| | | | |
|---|---|---|---|
| KR | 1020130021520 | A | 3/2013 |
| KR | 101691149 | B1 | 12/2016 |
| KR | 1020180064040 | A | 6/2018 |
| KR | 102115121 | B1 | 5/2020 |

* cited by examiner

DOOR HINGE WITH DAMPING FUNCTION

REFERENCE TO RELATED APPLICATIONS

This is a continuation of International Patent Application PCT/KR2022/004874 filed on Apr. 5, 2022, which designates the United States and claims priority of Korean Patent Application No. 10-2021-0065881 filed on May 24, 2021, the entire contents of which are incorporated herein by reference.

FIELD OF THE INVENTION

The present disclosure relates generally to a door hinge. More particularly, the present disclosure relates to a door hinge with a damping function which is implemented according to the flow of oil when opening and closing a door so that a buffering force is applied during opening of the door, closing of the door is carried out smoothly, and in particular, due to rapid return of a damper unit, the damper unit immediately operates even when the door is closed immediately after being opened, thereby enabling smooth opening and closing of the door.

BACKGROUND OF THE INVENTION

In general, doors are used in kitchen cabinets and various electronic products such as kimchi refrigerators, washing machines, or folding mobile phones. Of these, mainly used are top hinged doors that are opened and closed up and down while being rotated around the hinge axis.

A hinge device used in the top hinged door is rotated while being mounted on the end of the door to open and close the door.

Meanwhile, a compression spring is installed in a door hinge. The compression spring generates a compressive force at an initial state where the door starts to be closed to slow down the rotational speed of a shaft so that the door is rotated slowly.

However, the compressive force of the compression spring is limited. Therefore, in the case of the door being configured to support the load of the door with only the compression spring as in the related art, when entering a proceeding state where the door continues to be closed, a larger compressive force sufficient to support the load of the door at this time cannot be generated. This has a disadvantage in that the rotational speed of the shaft cannot be effectively slowed down.

Due to this disadvantage, when entering the proceeding state for closing the door, the door is closed rapidly and collides with a body of a device, causing various safety accidents and causing damage to various electronic parts due to impact transmitted to the device, thereby shortening the lifespan of the device.

SUMMARY OF THE INVENTION

Accordingly, the present disclosure has been made keeping in mind the above problems occurring in the related art, and an objective of the present disclosure is to provide a door hinge with a damping function, the door hinge being capable of smoothly opening and closing the door.

Another objective of the present disclosure is to provide a door hinge with a damping function, the door hinge being capable of closing the door smoothly and opening the door quickly.

The above and other objectives and advantages of the present disclosure will become more apparent from the following description, and these will be encompassed widely in the scope of the present disclosure by not only the matters described in the appended claims and the exemplary embodiment described below, but also means and combinations within the range that can be easily inferred therefrom.

In order to achieve the above objectives, according to one aspect of the present disclosure, there is provided a door hinge for rotatably supporting a door so that the door performs an opening and closing operation, the door hinge including: a housing installed on the door, the housing including a space with an open side and a housing cap inserted into the open side; a main spring provided in the space of the housing; a damper unit configured to be elastically supported by the main spring, the damper unit including a bottom body having a first flow path formed at a center portion thereof, a top body inserted into the top body and having a second flow path formed at an outer peripheral portion thereof and a third flow path formed at a center portion thereof, and a checker having a plurality of openings, provided in the bottom body to be movable between the top body and the bottom body, and configured to block the third flow path when being moved to the top body; a shaft protruding from the side of the housing through the housing cap and configured to be rotated when the door is opened and closed; and a cam unit provided between the shaft and the damper unit, the cam unit including a top cam configured to be rotated in close contact with the shaft and having a first inclined surface formed at a bottom portion thereof, and a bottom cam having a second inclined surface formed at a top portion thereof and in contact with the first inclined surface.

According to a preferred embodiment of the present disclosure, the bottom body may further include: a receiving portion into which the top body is inserted; a recess formed under the receiving portion and having the checker provided therein; and a cross flow path formed on a bottom surface of the recess and configured to guide a movement of oil to the first flow path. Here, when the door is opened, the checker may be pushed upward to form a space between the checker and the bottom surface of the recess, so that the oil moved to the openings of the checker is moved to the first flow path through the cross flow path.

According to a preferred embodiment of the present disclosure, the door hinge may further include an auxiliary spring provided under the damper unit and configured to generate a buffering force when the damper unit is pushed.

According to a preferred embodiment of the present disclosure, the second flow path may include: an extension flow path configured to allow oil introduced into the first flow path of the bottom body to flow therethrough in a bent shape along a side surface of the top body; and a through flow path provided on the side surface of the top body through top and bottom portions of the top body and configured to allow the oil moved to the extension flow path to flow therethrough.

The present disclosure having the above-described configuration has the following effects.

When the door is opened and closed, a damping function is implemented according to the flow of oil. Therefore, a buffering force is applied during opening of the door, and closing of the door is carried out smoothly. In particular, due to rapid return of a damper unit, the damper unit immediately operates even when the door is closed immediately after being opened, thereby enabling smooth opening and closing of the door.

That is, during a closing operation of the door, when a shaft is rotated, the damper unit is pushed downward by the cam unit, and oil is introduced into a first flow path of a bottom body of the damper unit. As a result, a checker is pushed to a top body and blocks a third flow path of the top body, so that the oil is moved to a second flow path. As the cam unit is pushed downward, a buffering action is generated by the operation of a main spring and the damper unit, so that the door can be opened and closed smoothly.

During an opening operation of the door, the main spring pushes upward the damper unit. As the oil is introduced into the third flow path of the top body, the checker is pushed to the bottom body, and the oil is moved to an opening of the checker and moved to the bottom of the bottom body. As described above, due to rapid return of the cam unit, the main spring pushes the cam unit, so that the door can be opened easily.

The above and other effects of the present disclosure will be encompassed widely in the scope of the present disclosure by not only the above-described embodiments and the descriptions in the appended claims, but also effects that can occur within the scope of the present disclosure that can be easily inferred therefrom and possibilities of potential advantages contributing to industrial development.

DETAILED DESCRIPTION OF THE INVENTION

Reference will now be made in greater detail to an exemplary embodiment of the present disclosure with reference to the accompanying drawings. The present disclosure, advantages of the present disclosure, and objectives achieved by the present disclosure will become apparent from the detailed description of embodiments described below in conjunction with the accompanying drawings. Terms used herein are selected to describe embodiments and thus should not be construed as the limit of the present disclosure. As used herein, the singular forms are intended to include the plural forms as well, unless the context clearly indicates otherwise. Moreover, the terms indicating directions are intended to help understanding of the description and can change depending on the viewpoint.

Meanwhile, the terms “top”, “bottom”, “up”, and “down” described in the embodiment are defined for easy explanation on the basis of the states illustrated in FIGS. 2 and 3, and FIGS. 4*b* and 4*c*.

Figure 1:
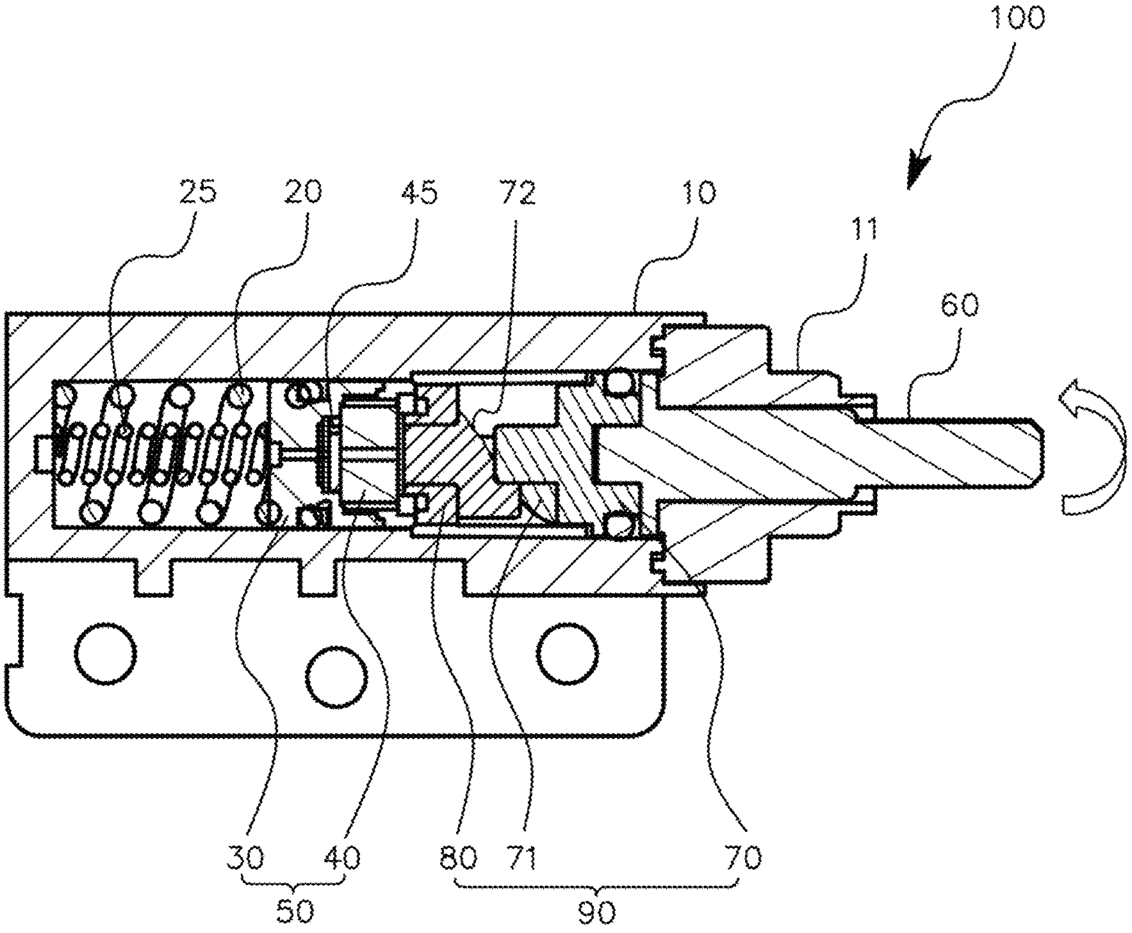
FIG. 1 is a view illustrating a door hinge with a damping function according to the present disclosure.

Hereinafter, a door hinge with a damping function according to an embodiment of the present disclosure will be described in detail with reference to the accompanying drawings. FIG. 1 is a view illustrating the door hinge with the damping function according to the present disclosure.

Referring to FIG. 1, the door hinge 100 with the damping function according to the present disclosure includes a housing 10, a main spring 20, a damper unit 50, a shaft 60, a cam unit 90, and an auxiliary spring 25.

The housing 10 is installed on a door. The housing 10 has a space with an open side. The main and auxiliary springs 20 and 25, the damper unit 50, and the cam unit 90, each of which will be described later, are provided in the space of the housing 10. The housing 10 includes a housing cap 11. The housing cap 11 is inserted into the open side of the housing 10. A shaft 60 is inserted into the housing cap 11. The shaft 60 protrudes from the housing 10 and is rotatably inserted.

The main spring 20 is provided in the space of the housing 10. The main spring 20 has a first end in contact with the damper unit 50 and a second end in contact with an inner wall surface of the space of the housing 10. The main spring 20 generates a compressive force as the damper unit 50 is pushed by the cam unit 90 when a door is closed. The main spring 20 facilitates opening of the door.

Figure 2:
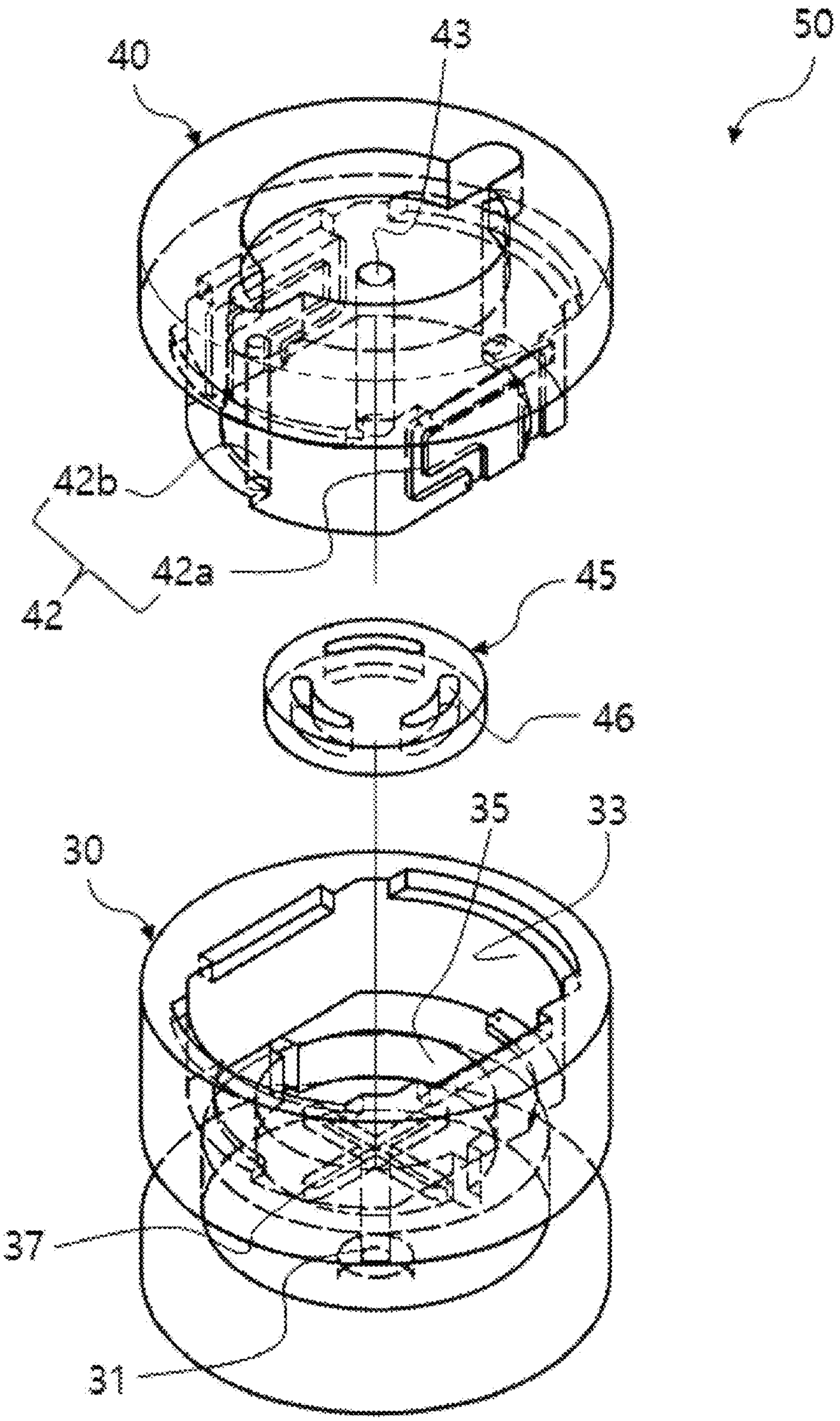
FIG. 2 is an exploded perspective view illustrating a damper unit in the door hinge with the damping function according to the present disclosure.

The damper unit 50 is elastically supported by the main spring 20 in the space of the housing 10. The structure of the damper unit 50 is illustrated in detail in FIG. 2. FIG. 2 is an exploded perspective view illustrating the damper unit in the door hinge with the damping function according to the present disclosure. Referring to FIG. 2, the damper unit 50 includes a bottom body 30, a top body 40, and a checker 45.

The bottom body 30 is a bottom part of the damper unit 50, i.e., a part in contact with the main spring 20 of the housing 10. The bottom body 30 includes a first flow path 31, a receiving portion 33, a recess 35, and a cross flow path 37. The first flow path 31 is formed to pass through a center portion of the bottom body 30. The first flow path 31 allows oil to flow therethrough. The receiving portion 33 is formed at a top portion of the bottom body 30, and is a portion to which the top body 40 is inserted and coupled.

Figure 4A:
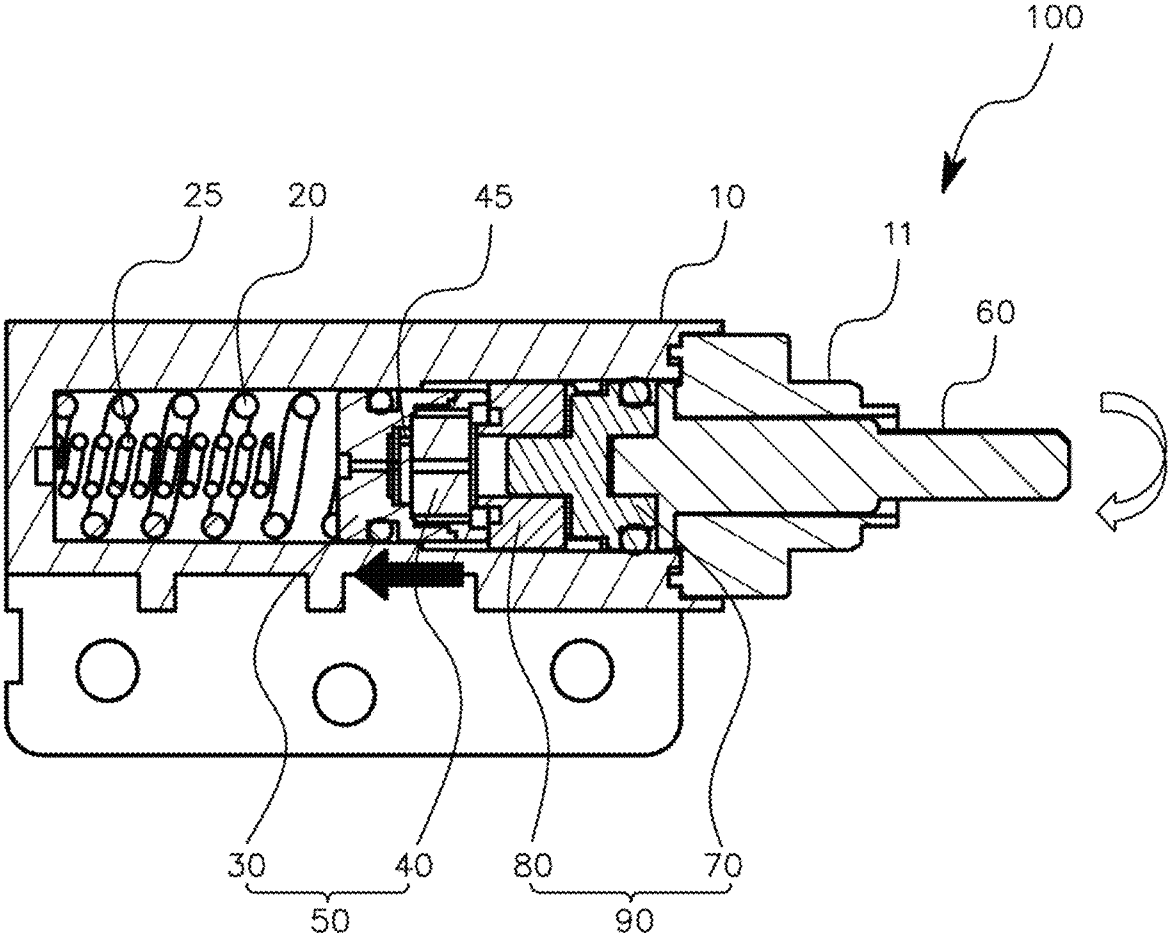
FIGS. 4*a* to 4*c* are views illustrating an opened state of the door hinge with the damping function according to the present disclosure.
Figure 4B:
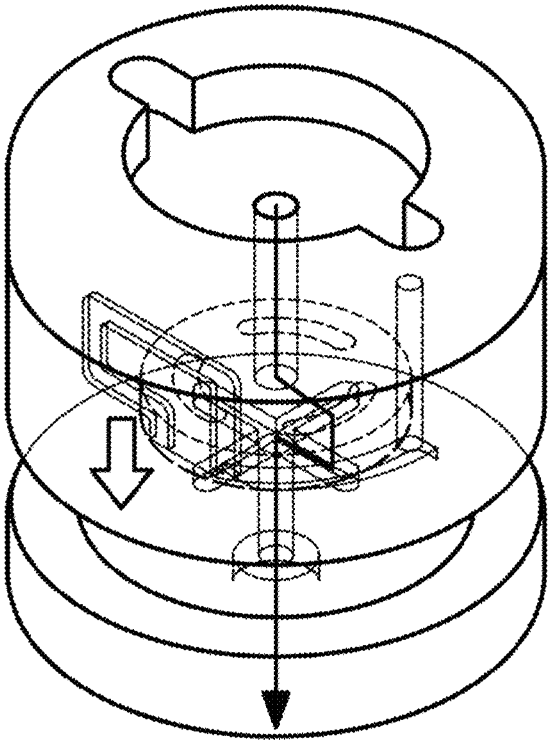
Figure 4C:
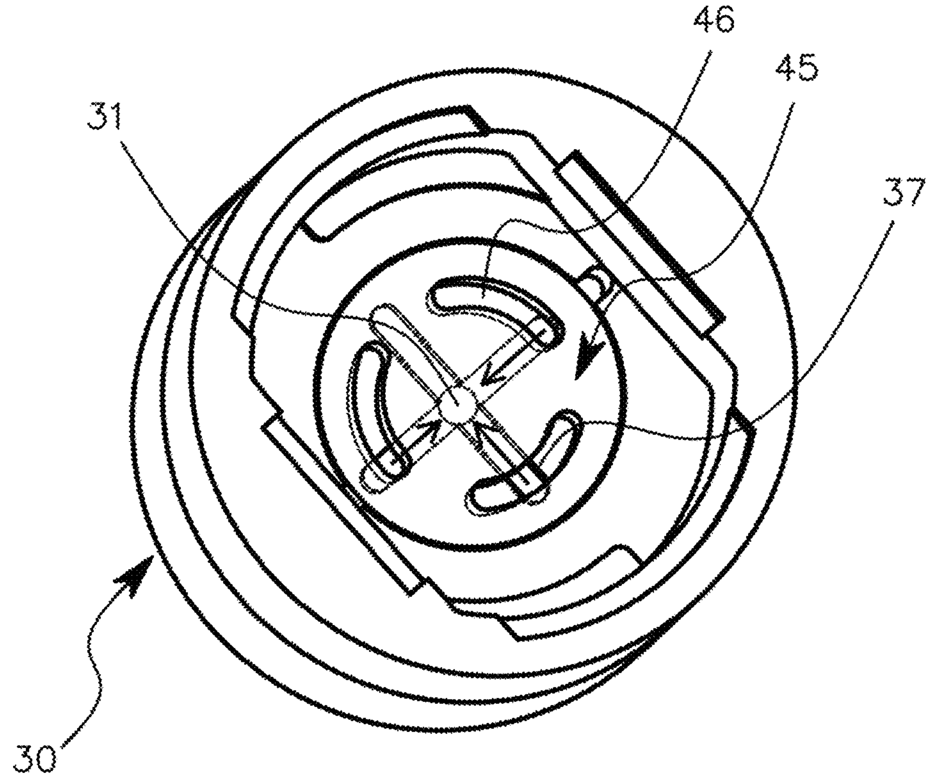

The recess 35 is formed between the receiving portion 33 and the first flow path 31, and has the checker 45 provided therein. The height of an inner wall of the recess 35 is longer than that of the checker 45 so that the checker 45 is moved up and down. The cross flow path 37 is formed on a bottom surface of the recess 35, and guides oil to flow into the first flow path 31. That is, as illustrated in FIG. 4C, the first flow path 31 is formed at a center portion of the cross flow path 37.

The top body 40 includes a second flow path 42 and a third flow path 43. The second flow path 42 is formed at an outer peripheral portion of the top body 40, and the third flow path 43 is formed at a center portion of the top body 40. The second flow path 42 allows oil to flow therethrough between the top body 40 and the bottom body 30. The second flow path 42 includes an extension flow path 42*a* and a through flow path 42*b*. The extension flow path 42*a* has a bent portion extending in a bent shape along a side surface of the top body 40 from a first side to a second side of a bottom portion of the top body 40, and an elongate portion extending from the bent portion along the outer circumference of a bottom surface of the top body 40. The elongate portion of the extension flow path 42*a* is connected to the through flow path 42*b*. The through flow path 42*b* is formed on the side surface of the top body 40 through the top and bottom portions of the top body 40. In the drawings, it is illustrated that two extension flow paths 42*a* and two through flow paths 42*b* of the top body 40 are formed at a first side and a second side of the top body 40, respectively.

The checker 45 is provided in the bottom body 30 to be movable between the top body 40 and the bottom body 30. The checker 45 is received in the recess 35 of the bottom body 30. The checker 45 is moved up and down in the recess

35 depending on whether or not oil is introduced. When the checker 45 is moved upward, the third flow path 43 of the top body 40 is blocked. When the checker 45 is moved downward, oil flows through an opening 46 of the checker 45 and exits through the cross flow path 37 of the bottom body 30. The checker 45 includes a plurality of openings 46. In the drawings, it is illustrated that three openings 46 are provided at regular intervals along the circumference of the checker 45, and are curved circular holes.

The shaft 60 protrudes from the side of the housing 10 through the housing cap 11. The shaft 60 is installed on a door set, and is rotated when the door is opened or closed. The shaft 60 has an end coupled with a top cam 70 of the cam unit 90. When the door is opened or closed, the top cam 70 is rotated in conjunction with the rotation of the shaft 60.

The cam unit 90 is provided between the shaft 60 and the damper unit 50. The cam unit 90 includes the top cam 70 and a bottom cam 80. The top cam 70 is in close contact with the shaft 60, and is rotated in conjunction with the rotation of the shaft 60. When the top cam 70 is rotated by the rotational motion of the shaft 60, the bottom cam 80 is pushed and moved linearly.

The top cam 70 has a first inclined surface 71 formed at a bottom portion thereof. The bottom cam 80 has a second inclined surface 72 formed at a top portion thereof and in contact with the first inclined surface 71. As illustrated in FIG. 4*a*, in a state where the first and second inclined surfaces 71 and 72 of the top cam 70 and the bottom cam 80 are in contact with each other, as the top cam 70 is rotated by the rotational motion of the shaft 60, the bottom cam 80 is pushed and moved linearly. As the bottom cam 80 is pushed backward by the top cam 70, the damper unit 50 is pushed backward.

The auxiliary spring 25 is provided under the damper unit 50, i.e., inside the main spring 20, in the space of the housing 10. The auxiliary spring 25 generates a buffering force when the damper unit 50 is pushed. As illustrated in FIG. 1, when the damper unit 50 is pushed, the auxiliary spring 25 generates the buffering force on the damper unit 50. When the damper unit 50 is pushed by the backward pushing motion of the cam unit 90, the auxiliary spring 25 generates the buffering force to resist the pushing of the damper unit 50. Like the main spring 20, the buffering force of the auxiliary spring 25 is transferred to the door through the damper unit 50, the cam unit 90, and the shaft 60 so that the door is opened and closed smoothly.

Figure 3:
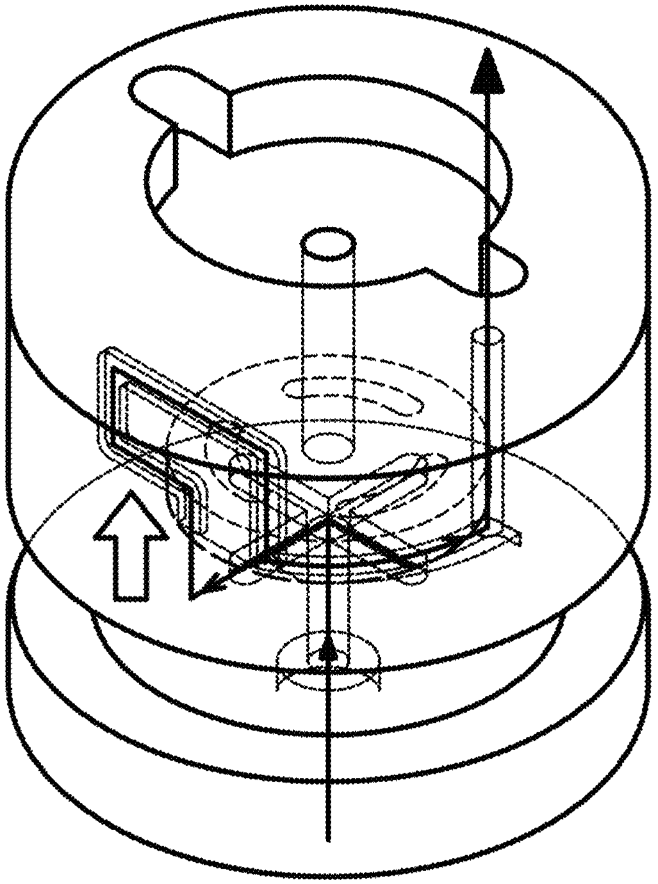
FIG. 3 is a view illustrating a closed state of the door hinge with the damping function according to the present disclosure.

Hereinafter, an opening and closing operation of the door hinge 100 with the damping function according to the present embodiment will be described. FIG. 3 is a view illustrating a closed state of the door hinge with the damping function according to the present disclosure. FIGS. 4*a* to 4*c* are views illustrating an opened state of the door hinge with the damping function according to the present disclosure.

First, a closing operation of the door will be described with reference to FIGS. 1 and 3. Referring to FIG. 1, when the door is closed, the shaft 60 is rotated. When the shaft 60 is rotated, the damper unit 50 is pushed downward by the cam unit 90, and oil is introduced into the first flow path 31 of the bottom body 30 of the damper unit 50. As a result, as indicated by the white arrow in FIG. 3, the checker 45 is pushed to the top body 40 and blocks the third flow path 43 of the top body 40, so that as indicated by the black arrow, oil is moved to the second flow path 42. The oil introduced from the bottom into the first flow path 31 exits upward through the cross flow path 37 and the second flow path 42 of the top body 40.

As the cam unit 90 is pushed downward, a buffering action is generated by the operation of the main spring 20, the auxiliary spring 25, and the damper unit 50.

Next, an opening operation of the door will be described with reference to FIGS. 4*a* to 4*c*. Referring to FIG. 4*a*, when the door is opened, the shaft 60 is rotated. As the cam unit 90 is returned, the main spring 25 pushes the damper unit 50 upward. As shown in FIG. 4*b*, as the oil is introduced into the third flow path 43 of the top body 40 of the damper unit 50, the checker 45 is pushed to the bottom body 30 as indicated by the white arrow, and the oil is moved to the openings of the checker 45 and moved to the bottom of the bottom body 30 as indicated by the black arrow. At this time, as illustrated in FIG. 4*c*, the oil introduced from the top into the third flow path 43 exits through the cross flow path 37 and the first flow path 31.

As described above, during the opening operation of the door, the main spring 20 pushes the cam unit 90 as the cam unit 90 is returned, so that the door can be opened easily. Since the damper unit 50 does not operate by itself and there is no resistance, the door can be opened smoothly by the main spring 20.

While the exemplary embodiment of the present disclosure has been described for illustrative purposes, those skilled in the art will appreciate that various modifications, additions, and substitutions are possible, without departing from the scope and spirit of the present disclosure. Therefore, the embodiment disclosed above and in the accompanying drawings should be considered in a descriptive sense only, and the scope of the present disclosure is not limited by the embodiment and the accompanying drawings. The spirit and scope of the present disclosure should be interpreted by the appended claims and encompass all equivalents falling within the scope of the appended claims.

DESCRIPTION OF THE REFERENCE NUMERALS IN THE DRAWINGS

100: door hinge with damping function
10: housing
11: housing cap
20 and 25: spring
30 and 40: body
31, 37, 42, and 43: flow path
33: receiving portion
35: recess
45: checker
46: opening
50: damper unit
60: shaft
70 and 80: cam
71 and 72: inclined surface
90: cam unit

What is claimed is:

1. A door hinge for rotatably supporting a door so that the door performs an opening and closing operation, the door hinge comprising:

a housing installed on the door, the housing comprising a space with an open side and a housing cap inserted into the open side;

a main spring provided in the space of the housing;

a damper unit configured to be elastically supported by the main spring, the damper unit comprising a bottom body having a first flow path formed at a center portion thereof, a top body inserted into the bottom body and having a second flow path formed at an outer peripheral portion thereof and a third flow path formed at a center portion thereof, and a checker having a plurality of openings, provided in the bottom body to be movable between the top body and the bottom body, and configured to block the third flow path when being moved to the top body;

a shaft protruding from the side of the housing through the housing cap and configured to be rotated when the door is opened and closed; and a cam unit provided between the shaft and the damper unit, the cam unit comprising a top cam configured to be rotated in close contact with the shaft and having a first inclined surface formed at a bottom portion thereof, and a bottom cam having a second inclined surface formed at a top portion thereof and in contact with the first inclined surface;

wherein the bottom body further comprises:

a receiving portion into which the top body is inserted;

a recess formed under the receiving portion and having the checker provided therein; and a cross flow path formed on a bottom surface of the recess and configured to guide a movement of oil to the first flow path, and wherein when the door is opened, the checker is pushed upward to form a space between the checker and the bottom surface of the recess, so that the oil moved to the openings of the checker is moved to the first flow path through the cross flow path.

2. The door hinge of claim 1, further comprising an auxiliary spring provided under the damper unit and configured to generate a buffering force when the damper unit is pushed.

3. The door hinge of claim 1, wherein the second flow path comprises: an extension flow path configured to allow oil introduced into the first flow path of the bottom body to flow therethrough in a bent shape along a side surface of the top body; and a through flow path provided on the side surface of the top body through top and bottom portions of the top body and configured to allow the oil moved to the extension flow path to flow therethrough.

* * * * *